(12) United States Patent
Nield et al.

(10) Patent No.: US 11,739,743 B2
(45) Date of Patent: Aug. 29, 2023

(54) SYSTEM AND METHOD FOR MONITORING A SKID MODULE

(71) Applicants: Barry J. Nield, Jacksonville Beach, FL (US); George A. Nield, Jacksonville Beach, FL (US)

(72) Inventors: Barry J. Nield, Jacksonville Beach, FL (US); George A. Nield, Jacksonville Beach, FL (US)

( * ) Notice: Subject to any disclaimer, the term of this patent is extended or adjusted under 35 U.S.C. 154(b) by 1094 days.

(21) Appl. No.: 16/443,198

(22) Filed: Jun. 17, 2019

(65) Prior Publication Data
US 2020/0392912 A1 Dec. 17, 2020

(51) Int. Cl.
| F04B 17/06 | (2006.01) |
| E21B 15/00 | (2006.01) |
| F02D 29/04 | (2006.01) |
| F04B 17/05 | (2006.01) |

(52) U.S. Cl.
CPC ............ F04B 17/06 (2013.01); E21B 15/003 (2013.01); F02D 29/04 (2013.01); F04B 17/05 (2013.01)

(58) Field of Classification Search
CPC .......... F04B 17/05; F04B 17/06; F02D 29/04; E21B 15/003; F16H 61/14; F16H 63/42
See application file for complete search history.

(56) References Cited

U.S. PATENT DOCUMENTS

| 4,073,352 | A | 2/1978 | Underwood |
| 4,432,064 | A | 2/1984 | Barker et al. |
| 4,785,689 | A * | 11/1988 | Iwatsuki .............. F16H 61/0021 477/906 |
| 4,896,569 | A * | 1/1990 | Ito .......................... F16H 61/12 477/65 |
| 6,192,303 | B1 | 2/2001 | Takakura et al. |
| 7,782,460 | B2 | 8/2010 | DiFoggio et al. |
| 8,575,541 | B1 | 11/2013 | Jamison |
| 9,845,663 | B2 | 12/2017 | Nield |
| 10,253,625 | B2 | 4/2019 | Williams |
| 10,273,761 | B2 | 4/2019 | SadAbadi et al. |
| 2002/0043620 | A1 | 4/2002 | Tchakarov |
| 2009/0284259 | A1 | 11/2009 | Csutak |

(Continued)

FOREIGN PATENT DOCUMENTS

| CN | 105697587 A | * | 6/2016 | .......... F16D 43/284 |
| JP | H05272636 A | * | 10/1993 | |
| WO | WO8200184 A1 | * | 1/1982 | |

OTHER PUBLICATIONS

English Machine Translation of JPH05272636A (Year: 1993).*
English Machine Translation of CN105697587A (Year: 2016).*

*Primary Examiner* — Nathan C Zollinger
(74) *Attorney, Agent, or Firm* — Steve LeBlanc, LLC (57) ABSTRACT

A system for monitoring the components of a skid module comprising a load driven by a motor associated with an automatic transmission using lockup technology includes a smart box associated with the skid module. Exemplary loads include mud pumps and generators. A plurality of sensors are associated with skid components and electrically associated with the smart box. The smart box uses at least some of said plurality of sensors to determine if the lockup technology is working properly and generates a warning when a lockup failure is detected. The skid module status is reported to at least one of a local display device or a remote display device in communication with the smart device over a network.

9 Claims, 4 Drawing Sheets

(56) References Cited

U.S. PATENT DOCUMENTS

| | | |
|---|---|---|
| 2010/0202932 A1 | 8/2010 | Danville |
| 2013/0118734 A1 | 5/2013 | Csutak |
| 2015/0204322 A1* | 7/2015 | Iund .................... F04D 15/0094 |
| | | 175/48 |
| 2015/0211529 A1* | 7/2015 | Minteer .................... F04D 7/04 |
| | | 417/15 |
| 2018/0223831 A1* | 8/2018 | Zhang .................... F04B 51/00 |

* cited by examiner

SYSTEM AND METHOD FOR MONITORING A SKID MODULE

FIELD OF THE INVENTION

The present invention generally involves an apparatus and method for monitoring a skid module comprising a motor associated with an automatic transmission comprising lockup technology for driving loads such as generators and mud pumps. The apparatus and method for monitoring include verifying proper operation of the lockup technology and recording and reporting the skid module status.

BACKGROUND OF THE INVENTION

Drill rigs are commonly used in oil and gas production and well service operations and include heavy duty machinery to bore substantial distances below the earth's surface. Such drill rigs are often located in remote locations. Thus, skidding systems are frequently utilized to move large structures and heavy-duty machinery around the rig or platform or between rigs. Skidding systems include three main types: cantilever skidding, drill floor skidding (lift and roll) and module skidding. Skid modules include pumping systems (e.g. Mud Pumps) and power generation systems.

Mud pumps are used with service rigs to pump high-pressure fluids through the drill string. Large engines/motors, like those used in tractor-trailer trucks, are coupled to the mud pumps to operate the mud pumps. Similarly, for power generation skid modules such engines are used to drive a power generator. These skid modules can cost millions of dollars, and if damaged, can result in even a greater loss due to rig downtime. Notably, such skid modules are generally situated away from the wellhead and are often unattended once they are started.

For older mud pump and generator skid modules, the large engines were coupled through a manual transmission to the load. One benefit of using a manual transmission is the direct mechanical coupling between the output shaft of the engine and the shaft that drives the load. Such a direct mechanical coupling has no slippage. The large engine systems sold today, however, come with an automatic transmission. As is well known, the basic automatic transmission relies on a fluid coupling between the motor output shaft and the input shaft of the associated transmission which engages and drives the load. The fluid coupling provided by an automatic transmission is less efficient than the direct coupling provided by a manual transmission as there can be "slippage". A simplified explanation of slippage is when the engine output shaft and the transmission input shaft are not rotating in sync or at the same speed (RPM). Slippage generates heat, which leads to more slippage, which leads to more heat. The problem becomes worse as the load increases. At best, the effect of slippage is limited to a loss in fuel economy. At worst, the heat generated by slippage will damage or destroy the engine and/or transmission making the million dollar skid useless and causing ever more expensive rig downtime and possibly resulting in injury to personnel.

To avoid slippage, the automatic transmissions of today comprise "lockup" technology such as a lockup clutch. For an automatic transmission comprising a lockup clutch, the lockup clutch engages as soon as the engine and the transmission run at approximately the same predefined speed above idle. After lockup is achieved there will be no slippage. The lockup clutch is designed to slip at idle to prevent the associated engine from stalling when there is no load. Such operation is similar to a car with an automatic transmission; it idles when it comes to a stop. The car's lockup clutch slips and the car idles. If the lockup clutch does not slip at idle the car's engine will stall. When the car accelerates to a predefined higher speed the lockup clutch engages and slippage is eliminated.

A problem arises, however, when an engine and associated transmission are operated at high loads without switching to lockup. If not monitored properly, the heavy-duty machines and skid modules can cause significant personnel and equipment damage should a lockup failure occur and the associated machine/skid module allowed to continue to operate without taking corrective action. What is lacking from the prior art is an apparatus and method for monitoring such skid module components and reporting their status.

One prior art apparatus and method for improved communications with a drill rig are disclosed in commonly owned U.S. Pat. No. 9,845,663 issued on 19 Dec. 2017 to Barry Nield of which the entire contents of such reference are hereby incorporated by this reference for all that it discloses for all purposes. The Nield '663 apparatus and method work well for remote monitoring of a drill rig and supplementing the knowledge, training, resources, and/or experience of the local personnel to enhance the safe and efficient operation of the heavy duty equipment. For example, the Nield '663 invention allows remote monitoring for more accurate and sophisticated analysis of operating parameters to improve trend analysis, facilitate maintenance scheduling, and/or anticipate imminent equipment failures or unsafe operating practices.

The Nield '663 invention would be enhanced by adding rig module monitoring. What is needed is an apparatus and method for monitoring the motor and transmission on a skid module to determine when there has been a lockup failure and issue an alert. The currently disclosed apparatus and method improve upon the Nield '663 invention by at least associating sensors with skid module engines and automatic transmissions components to allow monitoring the operation of the engine and transmission to verify proper lockup operation and detecting lockup failures that could damage the skid module.

BRIEF DESCRIPTION OF THE INVENTION

Aspects and advantages of the invention are set forth below in the following description, or may be obvious from the description, or may be learned through practice of the invention.

One embodiment of the present invention is an apparatus for monitoring the components of a skid module comprising a load driven by a motor associated with an automatic transmission using lockup coupling technology. The apparatus includes a smart box comprising a processing device electrically associated with a memory and communication technology. The memory is configured to store skid data and program code and the communication technology is configured to transmit the skid data over a network to a remote device. A sensor array comprising a plurality of sensors is electrically associated with the processing device wherein each sensor is configured for monitoring a skid parameter thereby defining said skid data. At least one sensor is associated with a motor drive element and at least one sensor is associated with a transmission drive element. The smart box is configured to evaluate the skid data to determine if said lockup technology is probably engaged. If the lockup technology is not properly engaged but should be engaged a warning is issued and transmitted to a remote user. For some embodiments, a user may use the apparatus to generate local and remote commands to control the skid module.

Another embodiment of the invention is an apparatus for monitoring the components of a skid module comprising a load driven by a motor associated with an automatic transmission using lockup coupling technology. The apparatus comprises a smart box means for collecting, storing and transmitting skid data over a network to a remote device. A sensor array means is electrically associated with the smart box means where each sensor is configured for sensing a skid parameter and generating skid data that is communicated to the processing device. The sensor array means includes at least a first sensor associated with a motor drive element and a second sensor associated with a transmission drive element. The smart box means is configured to evaluate the skid data to determine the associated skid module status including whether or not the lockup technology has been properly engaged.

In yet another embodiment of the present invention, a method for monitoring the components of a skid module comprising a load driven by a motor associated with an automatic transmission using lockup coupling technology is disclosed. A smart box is associated with a skid module wherein the smart box comprises a processing device electrically associated with a memory, a display device, and communication technology. A first sensor is associated with the processing device and a motor drive element to generate sensor data comprising motor drive data. Similarly, a second sensor is associated with the processing device and a transmission drive element to generate sensor data comprising transmission drive data. The processing device is further configured to collect sensor data, store sensor data in said memory and store threshold data in said memory comprising at least a lockup speed threshold value and a lockup delta threshold value. The processing device is further configured to use the communication technology to transfer at least one of the sensor data and threshold data to a remote device. At least one of the processing device or the remote device is configured to evaluate the motor drive data, the transmission drive data and the appropriate threshold values to determine when said lockup technology is properly engaged. The processing device causes a local or remote display to display a user interface wherein such user interface presents processed or unprocessed sensor data, threshold data and the status of the skid module and associated lockup technology.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeated use of reference characters throughout the present specification and appended drawings is intended to represent the same or analogous features or elements of the present technology.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit hereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, the term "in sync" means at the same time and for the same linear distance. For example, two objects move in sync if the two objects move at the same time and if a reference point on each object moves the same linear distance.

Figure 1:
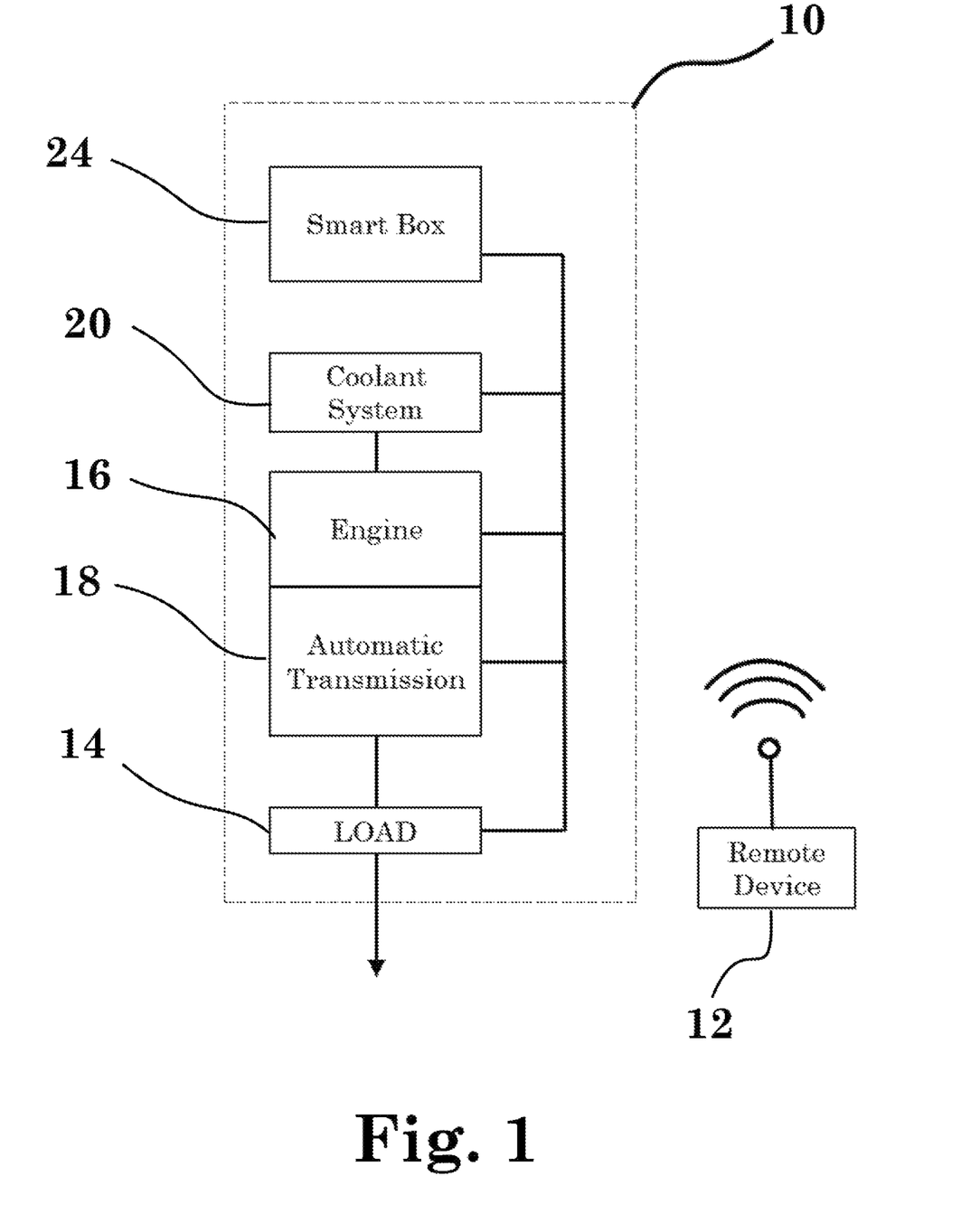
FIG. 1 is a block diagram of an exemplary skid module and apparatus for monitoring the skid module components and communicating the skid module status to a remote device according to one embodiment of the present invention.

Referring to FIG. 1, various embodiments of the present invention provide an apparatus and method for monitoring and recording the status of skid module 10 components and communicating the associated data to a remote device 12. An exemplary skid module 10 generally comprises a load 14 driven by a motor 16 associated with an automatic transmission 18 using lockup technology. A coolant system 20 is configured for circulating a coolant through the motor 16. The coolant system 20 may further comprise oil coolers for cooling the automatic transmission's 18 fluid and/or the motor 16 oil. Exemplary loads 14 include mud pumps and power generators and an exemplary motor 16 include internal combustion engines.

When the lockup technology engages, it allows the coupling technology that couples the motor output to the transmission input to "lock" the motor output to the transmission input shaft so that they move in synchronization thereby providing for a direct 1:1 communication between the motor 16 and transmission 18 thereby eliminating slippage. There are many lockup coupling technologies and they are well known by those of ordinary skill in the art and a detailed description thereof is not provided.

Figure 2:
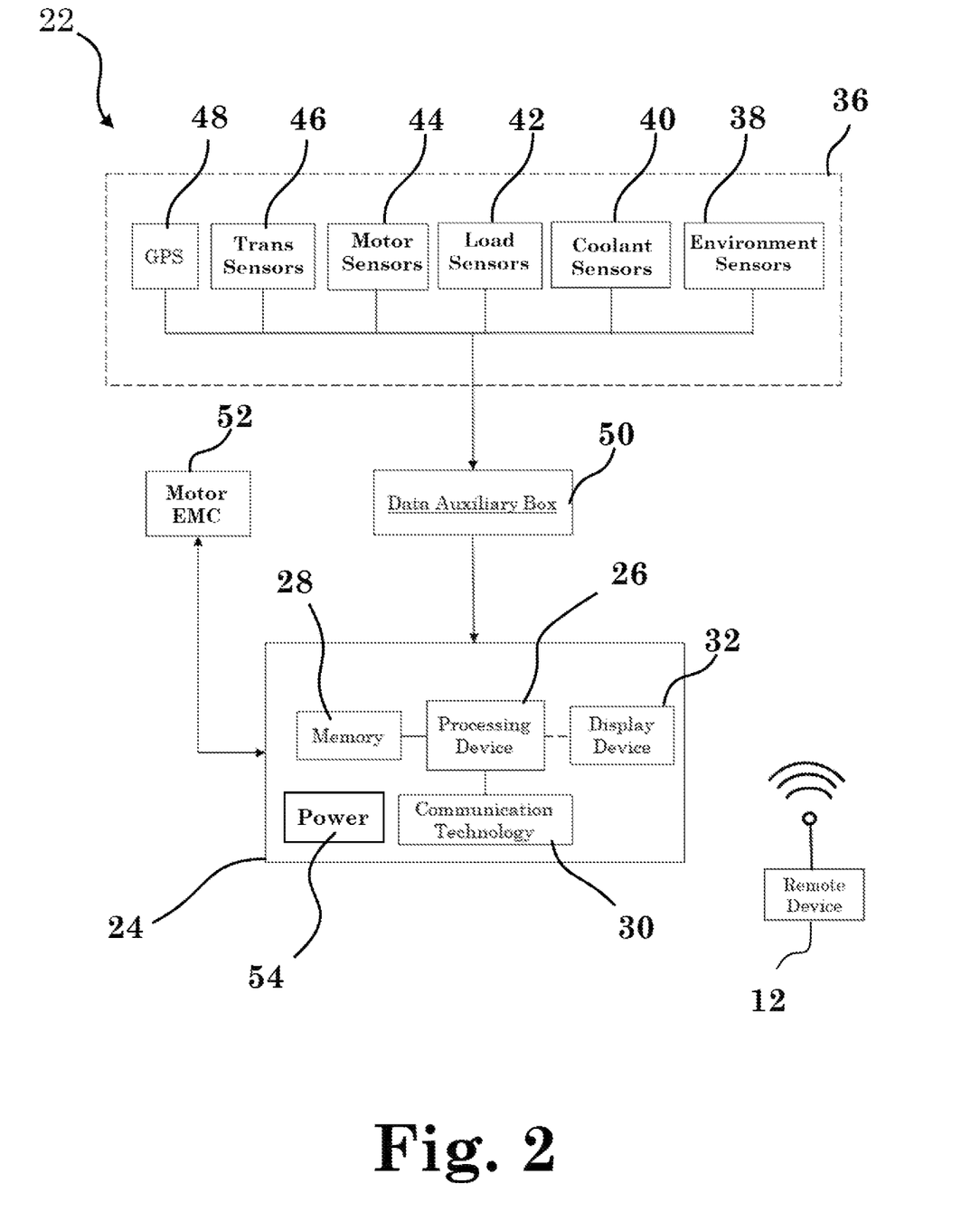
FIG. 2 is a block diagram of the apparatus in FIG. 1 for monitoring a skid module and communicating the skid module status to a remote device according to one embodiment of the present invention.

Referring to FIG. 2, one exemplary embodiment of an apparatus 22 for monitoring the components of a skid module 10 comprises a smart box 24. Smart Box 24 comprises a processing device 26 electrically associated with a memory 28 that is configured to store program code and data such as skid data. Skid data comprises sensor data and any associated threshold data as described in more detail below.

The processing device 26 includes either on-chip communication technology 30 or is electrically associated with communication technology 30 configured to transmit skid data and status information or over a network to a remote device 12. The Processing device 26 may further be electrically associated with a local display device 32 configured to display a user interface 34 such as a graphical user interface (GUI) generated or caused to be generated by processing device 26. Such user interface presents at least processed or unprocessed skid data as well as data derived from skid data including warnings.

A senor array 36, comprising a plurality of sensors, is electrically associated with smart box 24 wherein such sensors are each configured for monitoring a skid parameter thereby defining a type of skid data. A "sensor array" is simply one or more sensors disposed in a common housing or separate housing. The sensor array includes environment sensors 38, coolant sensors 40, load sensors 42, motor sensors 44, transmission sensors 46, and location sensors 48. The sensor array 36 may be associated with smart box 24 through an optional data auxiliary box 50 configured to house the various connections necessary to route the sensor data/signals to the smart box 24. Sensors may alternatively (collectively or individually) communicate with smart box 24 via wireless technology. Some sensors may also be housed inside smart box 24.

Examples of suitable environment sensors 38 include weather sensors, sound sensors, image sensors and user-defined sensors. Coolant sensors 40 include temperature sensors associated with various skid module 10 components including a motor oil temperature sensor, and a motor coolant temperature sensor, a transmission fluid temperature sensor, fuel temperature sensor, and temperature sensors associated with the load 14. Load sensors 42 include load RMP sensors, pressure sensors, power out sensors and flow rate sensors (depending on the type of load). Motor sensors 44 include RPM sensors, turbo boost sensors, fuel consumption sensors, and exhaust gas temperature sensors. Transmission Sensors (Trans Sensors) 46 include transmission input shaft RPM sensors, transmission output shaft RPM sensors, and gear selection sensors. The GPS (global positioning system) 48 sensor is simply one well-known sensor technology for determining location data.

Referring now to specific components associated with a sensor, for the preferred embodiment, a motor sensor 44 is associated with a motor drive element and a transmission sensor 46 is associated with a transmission drive element. Restated, the motor sensor 44 is associated with the motor side of the lockup technology and the transmission sensor 46 is associated with the transmission side of the lockup technology. One embodiment of an exemplary motor drive element is a crankshaft and one embodiment of an exemplary transmission drive element is a transmission input shaft for motors defining an internal combustion engine. The motor sensor 44 is configured to detect the rotations per minute (RPM) at the motor output and the transmission sensor 46 is configured to detect the RPM at the transmission input shaft. One of ordinary skill in the art will appreciate that the motor sensors 44 and the transmission sensors 46 may be accessed through a motor EMC (engine control module) 52 for embodiments comprising an EMC.

Either smart box 24 or the remote device 12 is configured to evaluate at least part of the skid data to determine if the lockup technology is properly engaged and generate and transmit a Lockup Alert when the lock lockup technology is not properly engaged. Such Lockup Alert by take many forms included messages sent using SMS and e-mail technologies.

One method of determining if the lockup coupling technology has been properly engaged is to use predefined threshold values. Threshold values are simply values for a particular sensor that define points of interest. A temperature threshold value, for example, might describe a temperature that should not be exceeded. For the current embodiment, a lockup speed threshold value and a lockup delta threshold value are used along with the appropriate sensor data to determine when the lockup coupling technology has been properly engaged.

One of ordinary skill in the art will appreciate that the lockup coupling technology should only engage when the motor output RPMs is above a predefined value. When the motor is operating below the motor RPM threshold the transmission should "uncouple" from the motor and the transmission's actual and measured RPM value should be less than the motor's RPM value (otherwise the motor might stall). When the motor is operating at or above the motor RPM threshold, the transmission's RPM value at the input shaft should not be materially less than the motor's RPM value (for proper lockup). For this example, when the motor's RPM value is above the lockup speed threshold value, and the difference between the motor's RPM value and the transmission's RPM value is less than the lockup delta threshold value, the motor output is considered to be properly "locked" to the transmission input shaft and the lockup technology has been properly engaged. Otherwise, a lockup failure warning or lockup alert is issued. Such warning can take many forms including SMS and e-mail based communications.

As noted above, a local display device 32 may be wired directly to the processing device 26 and be disposed on the skid module 10 or it may be in wireless communication with the processing device 26 and it may or may not be disposed on the skid module 10. For example, the local display device 32 may be a tablet computer carried by a user in close proximity to the skid module 10. Such wireless technology is relatively low power requiring the local display device 32 to be within a predefined distance to the skid module. Alternatively, the processing device 26 may be in communication with a remote display device 12 over a local or wide area network such as the Internet.

Figure 4:
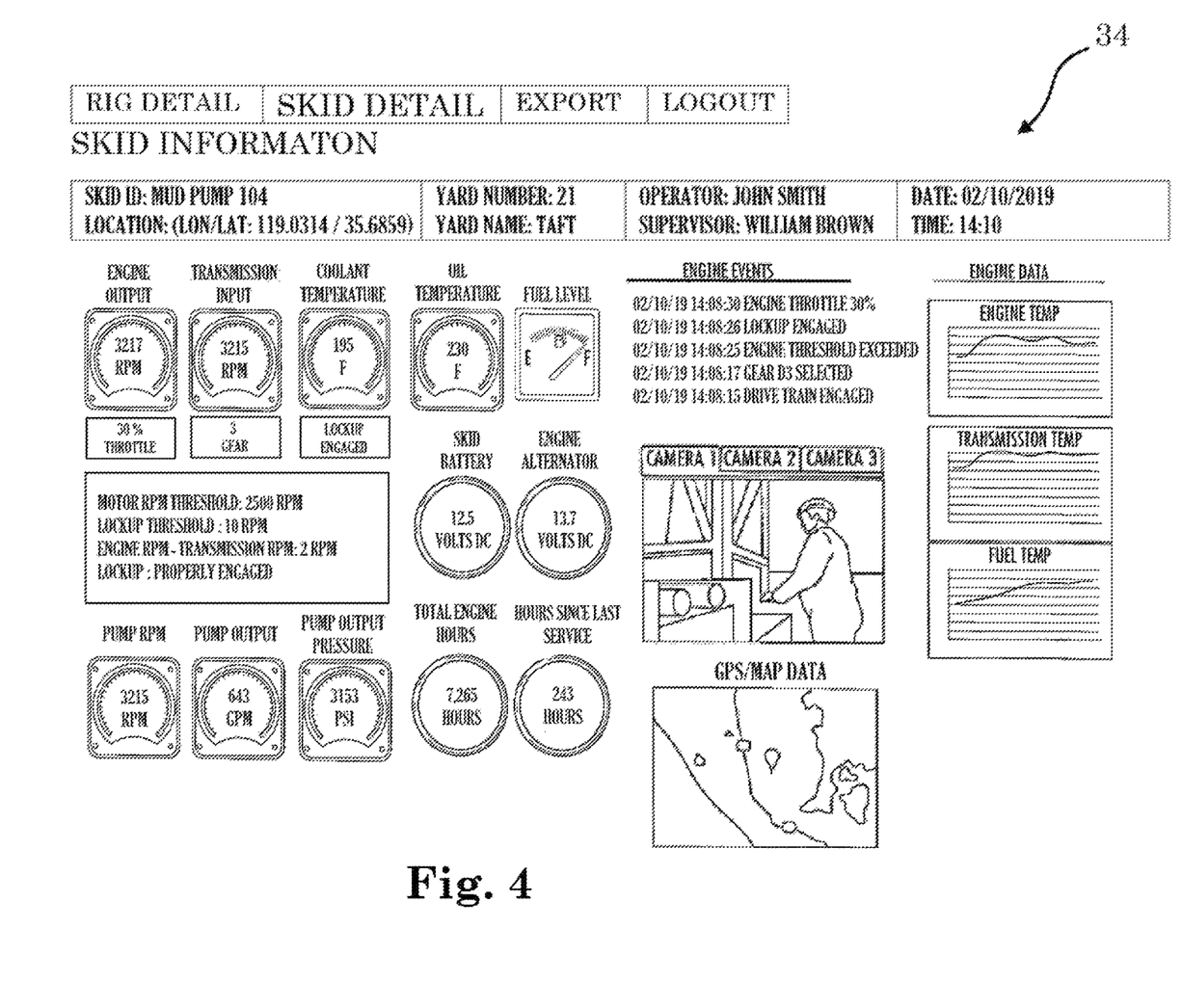
FIG. 4 is an exemplary screen shot of a GUI showing exemplary data made available to an apparatus user.

Referring now to FIG. 4, a Graphical User Interface (GUI) 34 is presented. For the basic GUI 34 configuration, the display device (local or remote) simply displays a selection of skid data comprising at least sensor data and threshold values. The display also display warnings. For one alternative embodiment, the GUI 34 generated on a local display device 32 presents the skid data and provides a control interface to allow a user to control the skid components through the GUI 34. For embodiments comprising an ECM 52 (or similar technology), such control options include issuing commands for controlling the motor 16 and the transmission 18.

For another alternative embodiment, such control interface is further generated on a remote display device 12 to allow remote control of the skid components including the motor and transmission (when an ECM or similar technology is present). For yet another alternative embodiment, automatic commands are stored in memory 28 and smart box 24 (and/or remote device 12) is configured to automatically evaluate the skid data and execute at least one automatic command when such evaluation meets the predefined condition(s) for executing an automatic command. For example, if the processing device 26 determines there has been a lockup failure and the motor temperature has exceeded its upper threshold temperature value, the processing device 26 may issue a warning that it is about to shut down the motor 16 while preferably giving a user a predefined time interval to issues an override request and stop the automatic shutdown action.

The smart box 24 components are normally powered by the skid module 10 when the skid module 10 is in operation. For one embodiment, an alternator is associated with motor 16 that is configured to supply a DC power source (e.g. 12 to 15 VDC). That said, the skid module 10 will need a power source to start the motor 16 when the skid is not operating. One example of such a power source is one or more heavy duty 12 VDC automobile batteries. Power source 54 (FIG. 2) for smart box 24 may be such automobile batteries or a dedicated battery that is preferably charged by the skid module when the motor 16 is operating. Power source 54 allows smart box 24 to operate when the skid module 10 is not operating. Such a configuration is useful, for example, when one wishes to locate a skid module 10 that is not operating.

Monitoring and Reporting Process

Figure 3:
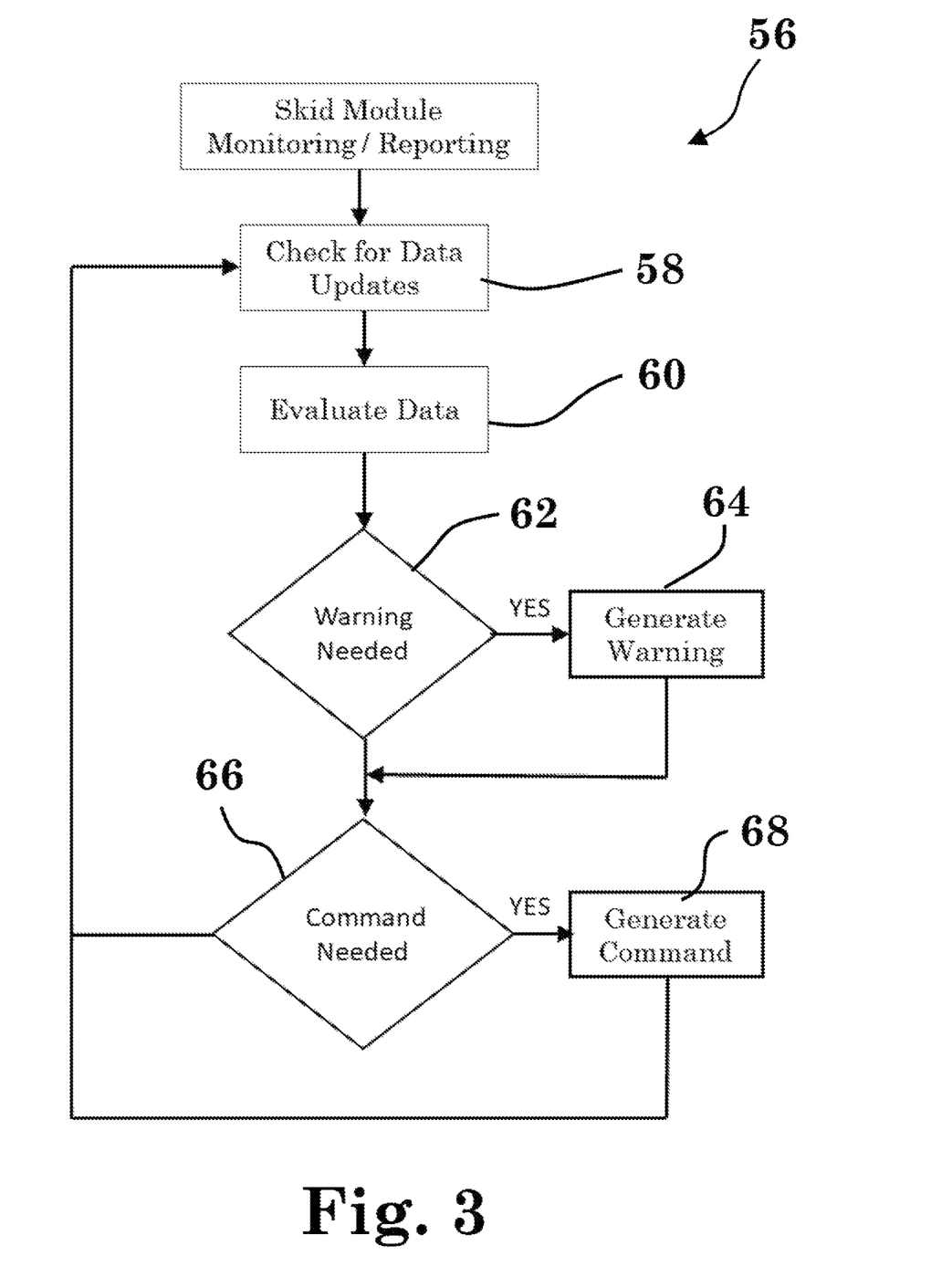
FIG. 3 is an exemplary method for monitoring a skid module and generating warnings and/or commands as needed.

Referring now to FIG. 3, an exemplary monitoring and reporting process 56 is presented. At block 58 the smart box 24 checks for sensor data updates and updates received from remote devices and updates the GUI 34 display as needed. At block 60, the data is evaluated to determine if any warnings should be generated. At block 62, the smart box 24 compares sensor data to its relevant threshold values and if the detected sensor data is outside a threshold, program control is passed to step 64 and a warning is issued which includes updating the GUI 34 as needed. Such warnings can include transmitting messages suing SMS and/or e-mail technologies. If no warning condition is detected or after a warning is issued, program control is passed to block 66 where the smart box 24 determines if a command should be executed. For this step, a generate command condition can be caused by any one of at least three events: (1) a command request is received from a local device 32; (2) a command request is received from a remote device 12; and (3) an automatic command is generated by smart box 24. If a command is to be generated and executed, program control passes to step 68 where the appropriate command warning (if any) is generated and executed. If no command is required or after a command has been generated and executed, program control passes back to block 58 and the process repeats. Notably, before an automatic command is executed a warning is issued indicating that an automatic command is pending, the GUI 34 is updated with such warning along with a count down timer value to allow a user time to override the pending command. A similar wait process may also be used for any command to be executed regardless of what device initiated the command request.

Smart Box Elecronics

The smart box 24 electronic hardware comprises standard components known in the art although such hardware configuration and control routines are novel. The processing device 26 may be a microprocessor that supports standard operating systems and application software as well as ASICs (application specific integrated circuit) or ASSPs (application specific standard product) or a PIC (programmable Intelligent Computer). The processing device 26 may comprise onboard ROM, RAM, EPROM type memories 28 for storing data and/or program code such as firmware. Processing device 26 may be further associated with off-chip memory 28 including remote storage such as cloud storage. For one embodiment, smart box 24 comprises a DSP/ASSP (not shown) electrically associated with the processing device 26 configured to perform signal processing tasks such as voice, audio, video, encoding, decoding as well as other data and signal processing functions. Such allows a video sensor, for example, to record images and sound as well as generate the same.

The communication technology 30 may define a transmitter and/or a transceiver configured to transmit a data signal to a remote device 12 (smartphone, WiDi enabled display, remoter computer, etc). Embodiments of suitable communication technologies 30 include custom designs as well as WiFi and Bluetooth transceivers, GPRS, GSM, GPRS, 3G, 4G, 5G and EDGE enabled networks as well as WAP networks. Such communications may take the form of SMS and e-mail messages.

One of ordinary skill in the art will recognize that the inherent flexibility of computer-based systems allows for a great variety of possible configurations, combinations, and divisions of tasks and functionality between and among components. For instance, methods discussed herein may be implemented using a single server or multiple servers working in combination. Similarly, databases and logic for manipulating the databases may be implemented on a single system or distributed across multiple systems sequentially or in parallel. Data transferred between components may travel directly or indirectly.

The various computer systems discussed herein are not limited to any particular hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter, as well. For instance, one or more computing devices may be adapted to provide desired functionality by accessing logic or software instructions rendered in a computer-readable form. When software is used, any suitable programming, scripting, or another type of language or combinations of languages may be used to implement the teachings contained herein. However, software need not be used exclusively, or at all. For example, some embodiments of the systems and methods set forth herein may also be implemented by hard-wired logic or other circuitry, including, but not limited to application-specific circuits. Of course, combinations of computer-executed software and hard-wired logic or other circuitry may be suitable, as well.

Embodiments of the systems and methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally, or alternatively, the computing device(s) may comprise circuitry that renders the device(s) operative to implement one or more of the methods of the present subject matter. Furthermore, components of the presently disclosed technology may be implemented using one or more computer-readable media. Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An apparatus for monitoring components of a skid module, said apparatus comprising:
    a smart box associated with the skid module comprising a load driven by a motor associated with an automatic transmission using lockup coupling technology wherein said smart box comprises a processing device electrically associated with a memory configured to store skid data and threshold values and communication technology configured to transmit said skid data and messages to a remote device;
    a sensor array electrically associated with said processing device wherein said sensor array comprises a plurality of sensors each configured for monitoring a skid parameter thereby defining at least part of said skid data wherein a first sensor is associated with a motor drive element and a second sensor is associated with a transmission drive element;
    wherein said memory stores a lockup speed threshold value and a lockup delta threshold value wherein said lockup speed threshold value defines a minimum motor drive element RPM allowed for proper engagement of said lockup coupling technology and wherein said lockup delta threshold value defines a maximum allowable difference between a motor drive element RPM and a transmission drive element RPM;
    wherein said motor is an internal combustion engine and wherein said motor drive element is a crankshaft and wherein said transmission drive element is an input shaft;
    wherein said smart box is configured to evaluate said skid data and said threshold values to determine if said lockup coupling technology has been engaged;
    wherein said smart box is configured to automatically shut down said motor after a predefined wait period when a Lockup Alert has been generated and a measured temperature exceeds its associated temperature threshold value; and
    wherein said apparatus is configured to issue said Lockup Alert when a difference between a measured crankshaft RPM and a measured transmission input shaft RPM exceeds a lockup delta threshold value wherein said Lockup Alert is at least one of an SMS or e-mail message.

2. The apparatus for monitoring the components of the skid module as in claim 1, wherein said load is one of a mud pump or a power generator and wherein said smart box further comprises a display device electrically associated with said processing device and wherein said processing device is configured to cause said display device to generate a user interface that displays at least part of said skid data and allows local control of the components of the skid module.

3. The apparatus for monitoring the components of the skid module as in claim 2, wherein said smart box is further configured to allow remote control of the components of the skid module.

4. The apparatus for monitoring the components of the skid module as in claim 3, wherein said memory is configured to store at least one automatic command and wherein said smart box is configured to evaluate said skid data and execute at least one said automatic command based on said evaluation of said skid data.

5. The apparatus for monitoring the components of the skid module as in claim 4, wherein said sensor array comprises a plurality of coolant sensors including a motor oil temperature sensor, an engine coolant temperature sensor, and a transmission fluid temperature sensor and where said skid data includes the temperature data generated by said plurality of coolant sensors and their associated threshold values.

6. An apparatus for monitoring components of a skid module comprising a load driven by a motor associated with an automatic transmission using lockup coupling technology, said apparatus comprising:
    a smart box means for collecting, storing and transmitting skid data and warnings wherein said skid data includes sensor data and threshold values;
    wherein said threshold values comprise a lockup speed threshold value and a lockup delta threshold value
    a sensor array means associated with said smart box means and configured for sensing skid parameters and generating said skid data wherein said sensor array means includes a first sensor associated with a motor drive element and a second sensor associated with a transmission drive element;
    wherein said motor is an internal combustion engine and wherein said motor drive element is a crankshaft and wherein said transmission drive element is an input shaft and wherein said first sensor is associated with said crankshaft and wherein said second sensor is associated with said input shaft;
    wherein said load is one of a mud pump or a power generator;
    wherein said smart box means is configured to evaluate said skid data to determine if said lockup coupling technology is properly engaged and generate and transmit a status of said lockup coupling technology to a remote device; and
    wherein said smart box means is configured to automatically shut down said motor after a predefined wait period when a Lockup Alert has been generated and a measured temperature exceeds its associated temperature threshold value;
    wherein said smart box means is configured to cause a user interface to be displayed on a local display device or a remote display device and wherein said user interface comprises at least part of said skid data; and
    wherein said Lockup Alert is issued when the smart box means determines that a measured crankshaft RPM is above said lockup speed threshold value and a difference between the measured crankshaft RPM and a measured input shaft RPM exceeds said lockup delta threshold value.

7. The apparatus for monitoring the components of the skid module as in claim 6, wherein said user interface provides for and allows local control of the components of the skid module.

8. The apparatus for monitoring the components of the skid module as in claim 7, wherein said smart box means is configured for receiving and executing remote commands to allow remote control of the components of the skid module.

9. The apparatus for monitoring the components of the skid module as in claim 8, wherein said smart box means is configured to store at least one automatic command and wherein said smart box is configured to evaluate said skid data and execute at least one of said stored automatic command based on the evaluation of said skid data.

\* \* \* \* \*